(No Model.)
O. W. DEAN.
CAR BRAKE.
No. 498,774. Patented June 6, 1893.
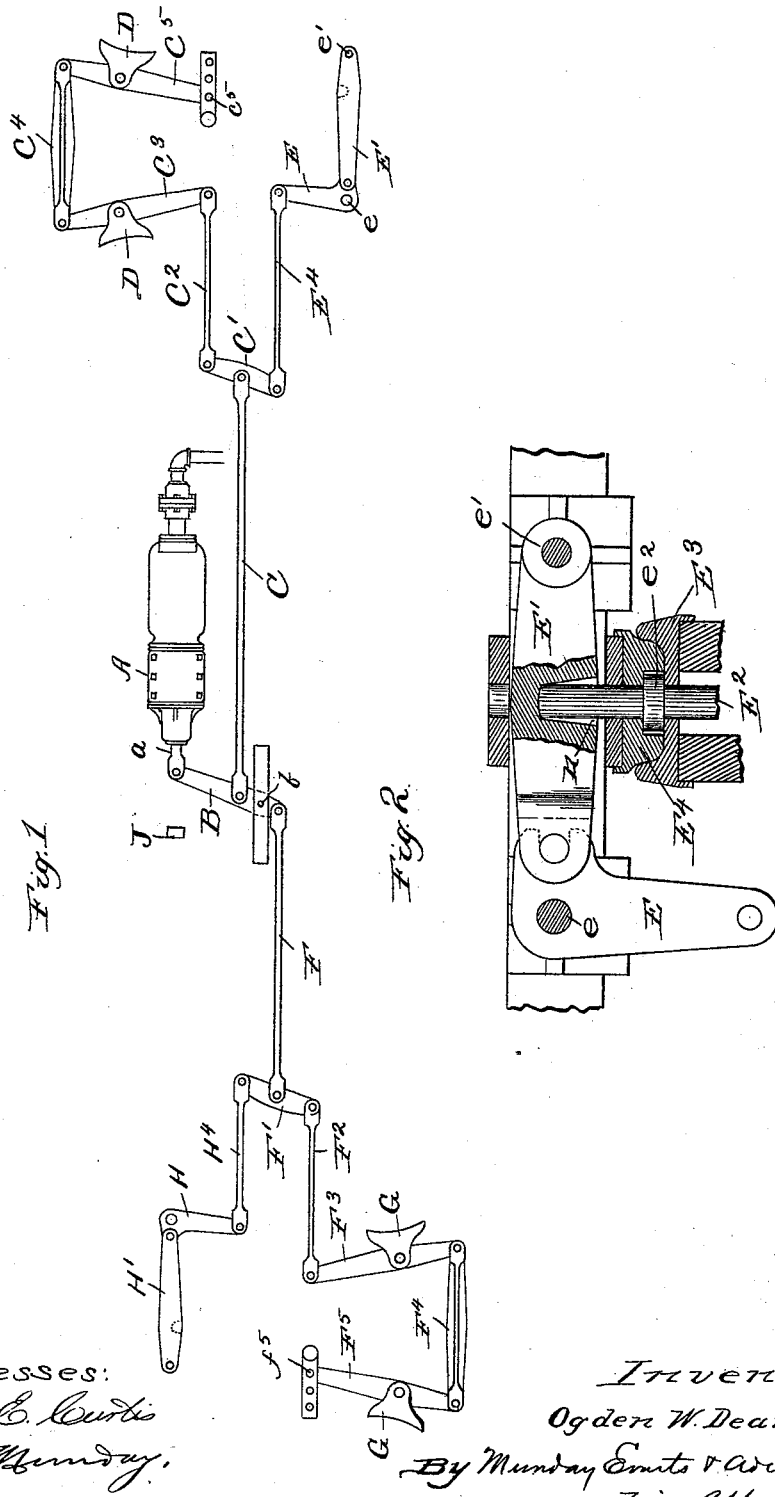
Witnesses:
Geo. E. Curtis
H. W. Munday
Inventor:
Ogden W. Dean
By Munday, Evarts & Adcock
His Attorneys.

UNITED STATES PATENT OFFICE.

OGDEN W. DEAN, OF CHICAGO, ILLINOIS.

CAR-BRAKE.

SPECIFICATION forming part of Letters Patent No. 498,774, dated June 6, 1893.

Application filed March 21, 1892. Serial No. 425,657. (No model.)

*To all whom it may concern:*

Be it known that I, OGDEN W. DEAN, a citizen of the United States, residing in Chicago, in the county of Cook and State of Illinois, have invented a new and useful Improvement in Braking Apparatus for Railroad-Cars, of which the following is a specification.

My aim in the present invention is to provide means whereby the weight of the car may be utilized in taking up the excessive pressure caused by the brake and relieving the wheels therefrom.

The invention consists in the combination in a car of braking apparatus, devices for lifting the car from the truck and connecting levers between said apparatus and said lifting devices adapted to actuate the latter when the pressure becomes excessive.

In the drawings I show at Figure 1 a diagram of the braking apparatus, the lifting devices, and the connections between the two. Fig. 2 is a vertical elevation partly in section of the lifting mechanism.

In said drawings A represents the cylinder, and $a$ the piston of an ordinary brake cylinder, the same actuating a power lever B pivoted to a stationary pivot $b$. This lever B may be actuated however by other power than that of cylinder A.

Between lever B and the brake shoe D at one end of the car I employ the following system of levers: A rod C extends from the lever B to the center of a lever $C'$, one end of which is joined by a rod $C^2$ to the brake shoe lever $C^3$ carrying one of the shoes D. A connecting bar $C^4$ joins lever $C^3$ to lever $C^5$ carrying the other brake shoe, and the lower end of this lever $C^5$ is stationarily pivoted at $c^5$.

The lifting devices may consist of the elbow lever E, pivoted at $e$, the horizontal lever $E'$ actuated by said elbow lever and pivotally joined to the car body at $e'$ and having a fulcrum upon the center pin $E^2$ sustained in the truck, the part $E^3$ only of which is shown. These lifting devices are joined to the system of brake levers by a rod $E^4$ attached to the elbow lever E at one end, and at its other end to the end of the lever $C'$ opposite to the end to which the rod $C^2$ is connected.

With this construction the operation is as follows:—The power of lever B is first transmitted to and received by the brake shoes D D. This necessarily results because the weight of the car prevents any actuation of the lifting devices until after the pressure upon the wheels has become equal to the pressure required to operate the lifting devices. When, however, the pressure has reached this stage if any further movement is imparted to the power lever, the increased pressure caused thereby will be divided between the brakes on the one hand and the lifting devices on the other and the latter be actuated, the lever $C'$ permitting the actuation of the brakes in the first instance and transmitting no power to the lifting devices until the resistance offered by the brakes becomes equal to the power required to operate the lifting devices, and causing the division of the power added after this equalization between the brakes and the lifting devices.

My improvement may be employed with braking apparatus acting upon both trucks, and this is a desirable construction because I am enabled thereby to obtain the benefit of any load which may be in the car regardless of its location therein. The connections at one end of the car have already been described. Those at the other end may consist of a rod F corresponding to the rod C and united to the power lever beyond the pivot $b$, equalizing lever $F'$ corresponding to lever $C'$, a rod $F^2$ corresponding to rod $C^2$, lever $F^3$ corresponding to lever $C^3$ and carrying one of the brake shoes G, a connecting bar $F^4$ corresponding to bar $C^4$, and another shoe lever $F^5$ corresponding to lever $C^5$ stationarily pivoted at $f^5$. The equalizing lever $F'$ is joined to a connecting rod $H^4$, similar to rod $E^4$, joined at one end to an elbow lever H similar to the elbow lever E, and actuating a lever $H'$ similar to lever $E'$ and bearing upon the center pin of the other truck. With the double apparatus the lifting devices are not actuated of course until the resistance caused by the weight of the entire car and its load is overcome by the power put on by the power lever.

As already stated the power lever is pivoted to a fixed point at $b$, and the braking and lifting apparatus of one truck are joined to such lever between such pivot and the brake cylinder, and the braking and lifting apparatus of the other truck are joined to the power lever at a point beyond the pivot $b$. This renders the two sets of braking and lifting apparatus independent of each other in a measure, that is to say either may be detached from the power lever without appreciable effect upon the operation of the other, and either is capable of efficient work whether the other operates or not. It is advantageous however to use the double apparatus because the braking power applied to each truck is in that case always proportionate to the weight upon the truck.

A stop J may be placed in the path of the piston $a$ to cause an absolute cessation of movement by the piston at the proper point to avoid straining the cylinder head.

While I have illustrated a system of brake levers varying in only one or two particulars from those in common use, I do not wish to be limited to the construction shown, nor do I wish to be limited to the construction of lifting devices shown. Both of these features may be greatly modified without departing from the principle of my invention.

The part $E^3$ is the lower center plate borne upon the truck and $E^4$ is the upper center plate resting upon $E^3$. In order to give the center pin a bearing directly upon the lower center plate I provide it with a collar $e^2$ as plainly illustrated. I thus cause the burden to be transmitted directly through the center pin to the lower center plate when the car is lifted.

It is necessary that the lifting lever E' should have freedom to rock on the center pin. For this reason the recess in the lever which receives the center pin is widened at each side, as indicated at $n$.

I claim—

1. The combination in braking apparatus of the power lever, the brake levers and the lifting devices, with an equalizing lever joined at its center to the power lever, at one end to the brake levers, and at the other end to the lifting devices, substantially as set forth.

2. The combination with the power lever, the brake levers, and the lifting devices, of the lever C', a connection between the power lever and said lever C' joined to the latter near its center, a connection from one end of said lever C' to the brake levers, and a connection from the other end thereof to the lifting devices, substantially as specified.

3. In devices for lifting the car, the combination of a lifting lever, and the center pin of the car acting as a fulcrum for the lever, substantially as specified.

4. The combination with the car and its trucks, of a brake and lifting mechanism at each truck, a single brake cylinder and lever connections between the brakes and the cylinder essentially as set forth, whereby both the brakes and lifting mechanisms are actuated by the single cylinder and each remains operative in case the other becomes disabled, substantially as specified.

5. The combination with the car, its trucks and a single air brake cylinder, of a brake and a lifting mechanism at each of said trucks, both the brakes having a lever connection with the cylinder, and each being independent of the other, and each of the lifting mechanisms being actuated by the levers of its companion brake, substantially as specified.

6. The combination with a car of a brake cylinder, a power lever actuated by said cylinder and pivoted as at $b$, braking levers for each truck joined to said power lever at opposite sides of said pivot $b$ and actuated by said lever, and lifting devices for each truck connected to and receiving power from the braking levers, substantially as specified.

7. The combination of lifting lever E' with the center pin $E^2$ upon which it is fulcrumed and which is provided with collar $e^2$, and center plate $E^3$ upon which said collar rests and which is supported upon the truck, substantially as set forth.

8. The combination in the lifting mechanism of a car, of lever E', center pin $E^2$ acting as a fulcrum for said lever and provided with a collar $e^2$, and center plate $E^3$ supporting said collar, substantially as set forth.

9. The combination of lifting lever E' and center pin $E^2$ acting as a fulcrum for said lever, said lever being recessed to receive said pin and said recess being widened to permit the rocking of the lever upon the pin, substantially as set forth.

OGDEN W. DEAN.

Witnesses:
 EDWARD S. EVARTS,
 EMMA HACK.